US012109722B2

(12) United States Patent
Rice

(10) Patent No.: US 12,109,722 B2
(45) Date of Patent: Oct. 8, 2024

(54) PNEUMATIC DRYWALL HOLE PUNCH MACHINE

(71) Applicant: Thomas Henry Rice, West Des Moines, IA (US)

(72) Inventor: Thomas Henry Rice, West Des Moines, IA (US)

( * ) Notice: Subject to any disclaimer, the term of this patent is extended or adjusted under 35 U.S.C. 154(b) by 0 days.

(21) Appl. No.: 17/664,496

(22) Filed: May 23, 2022

(65) Prior Publication Data

US 2022/0379516 A1 Dec. 1, 2022

Related U.S. Application Data

(60) Provisional application No. 63/202,138, filed on May 28, 2021.

(51) Int. Cl.
*B26F 1/44* (2006.01)
*B26D 5/12* (2006.01)
*E04B 1/70* (2006.01)

(52) U.S. Cl.
CPC .................. *B26F 1/44* (2013.01); *B26D 5/12* (2013.01); *E04B 1/7069* (2013.01)

(58) Field of Classification Search
CPC ...... B26F 1/44; B26F 1/14; B26F 1/24; B26F 1/32; B26F 1/34; B26D 5/12; E04B 1/7069; E04B 1/70
See application file for complete search history.

(56) References Cited

U.S. PATENT DOCUMENTS 3,863,341 A 2/1975 Ramer
5,370,268 A 12/1994 Adams
6,442,847 B1 9/2002 Chen
6,502,491 B2 * 1/2003 Borowczak .......... B26D 7/1818 83/358
7,225,959 B2 * 6/2007 Patton ..................... F04B 35/04 173/217
9,174,332 B2 * 11/2015 Burke ....................... B25C 1/04
10,821,623 B2 * 11/2020 Hare ......................... B26F 1/32
2009/0193953 A1 * 8/2009 Romeo .................. A23N 15/00 83/639.1
2011/0072947 A1 * 3/2011 Prout ..................... B21D 28/26 83/639.4

(Continued)

FOREIGN PATENT DOCUMENTS

AU 778644 B2 12/2004
CN 206317152 U * 7/2017

(Continued)

OTHER PUBLICATIONS

CN 206317152 and Translation (Year: 2017).*

(Continued)

*Primary Examiner* — Jonathan G Riley

(74) *Attorney, Agent, or Firm* — McKee, Voorhees & Sease, PLC

(57) ABSTRACT

A hole punching machine for use on wet or damp drywall improves ventilation behind the drywall for drying purposes. The machine includes a base position on the floor and against the wall. A pneumatic ram in the base can be extended and retracted to cut a hole in drywall, after any baseboard is removed. The hole can then be covered when the baseboard is reinstalled. The operator can activate the ram using a switch, while standing.

14 Claims, 8 Drawing Sheets

(56) References Cited

U.S. PATENT DOCUMENTS

| | | | | |
|---|---|---|---|---|
| 2017/0144323 A1* | 5/2017 | Hare | ......................... | B26F 1/32 |
| 2021/0276215 A1* | 9/2021 | Treivush | ................... | B26F 1/34 |

FOREIGN PATENT DOCUMENTS

| | | | | |
|---|---|---|---|---|
| DE | 3124507 A1 | 1/1983 | | |
| WO | WO-2010124036 A1 * | 10/2010 | ........... | G05D 16/103 |

OTHER PUBLICATIONS

Flanger/Punch Tool Pneumatic 7/32In, The Eastwood Company, 2021 [retrieved on Feb. 17, 2021]. Retrieved from the Internet: <URL:https://www.eastwood.com/flanger-punch-tool-pneumatic-7-32in.html>, 8 pages.

* cited by examiner

PNEUMATIC DRYWALL HOLE PUNCH MACHINE

CROSS REFERENCE TO RELATED APPLICATIONS

This application claims priority under 35 U.S.C. § 119 to provisional patent application U.S. Ser. No. 63/202,138, filed on May 28, 2021. The provisional patent application is herein incorporated by reference in its entirety, including without limitation, the specification, claims, and abstract, as well as any figures, tables, appendices, or drawings thereof.

TECHNICAL FIELD

The invention is directed towards a tool or machine for punching aeration holes in dry wall, also known as sheet rock, to allow drying of drywall that has become wet.

BACKGROUND OF THE INVENTION

The Drywall, also known as sheet rock, it is commonly used in houses and commercial buildings for internal walls and ceilings. Drywall is formed as a flat sheet or panel made of gypsum plaster sandwiched between two sheets of thick paper. The drywall sheets are nailed or screwed to wooden or metal studs, and then can be painted and textured.

Water damage to drywall arises from broken water pipes, rain water leaking into buildings, or floods. The gypsum is very absorbent, and thus must be dried out for repair or cut out for replacement. Drying sheet rock for repair generally involves punching holes in the sheet rock near the floor where water has been absorbed and letting the sheet rock air dry, preferably with the assistance of fans to speed the drying process. Otherwise, undesirable mold and mildew can form on the sheet rock, which creates additional problems requiring treatment or replacement of the sheet rock.

Most often, water damage to drywall occurs near the floor at the baseboard level of the wall. The drywall acts like a sponge to soak up water at the floor level, with the moisture migrating upwardly in the drywall panel. Restoration may save the drywall, eliminating the need for replacement, by removing the baseboard and then punching or drilling holes to drywall to allow air flow inside the wall cavities between wall studs. After the drywall is dry, the baseboard can be replaced to cover of the holes, without having to cut out and replace larger sections of the drywall.

Conventional restoration for water damage typically requires the technician or worker to get down on their knees, often in a wet environment, to remove the baseboard, and then punch or drill holes approximately one inch in diameter through the wet drywall. To form the holes, the technician holds a pipe in one hand, and strikes the pipe with a hammer in the other hand. This methodology is tiring work and sometimes leads to misplacement of holes above the baseboard, which then requires patching of the holes which are too high and repainting of the entire wall. Alternatively, a power drill and bit can be used to form holes, though drilling is messy and more time-consuming than the pipe and hammer method. Another option utilizes a strike plate with a spring-loaded hole punch attached to a waist-high shaft or post, which allows the operator to hit the plate with a sledgehammer while standing. Thus, this strike plate eliminates the need to for the technician to be on their hands and knees. However, this standing sledgehammer procedure is prone to missed hits and other accidental damage to the wall above the baseboard, leading to additional repairs.

Therefore, there is a need for a an easier, faster, and more accurate system and method for forming aeration holes in wet drywall to allow for less costly repairs.

Accordingly, a primary objective of the present invention is the provision of a pneumatic hole punch machine for forming holes in damp drywall adjacent to the floor.

Another objective of the present invention is the provision of an improved method of punching aeration holes in drywall.

A further objective of the present invention is the provision of a tool which allows an operator to make holes in drywall near the floor while standing upright.

Still another objective of the present invention is the provision of a tool or machine to make aeration holes in drywall while eliminating accidental damage to the drywall.

Yet another objective of the present invention is the provision of a machine with a hand activated pneumatic cutting tool to form aeration holes in sheet rock.

Another objective of the present invention is the provision of a switch-operated hole punch machine for sheet rock.

Still another objective of the present invention is the provision of a method of accurately and cleanly making aeration holes in wet sheet rock for drying the sheet rock.

These and other objectives will become apparent from the following description of the invention.

SUMMARY

The machine or tool for punching a ventilation/aeration hole in drywall includes a base adapted to sit on the floor, with the pneumatic cylinder mounted in the base, and having an extendable and retractable ram with a cutting tip. A switch is operatively connected to the cylinder to actuate the ram. Extension of the ram pushes the cutting tip through the drywall. The tip is then retracted, thus forming a hole in the drywall. The ram moves horizontally to create the aeration hole in the sheet rock. The switch is located on a leg extending upwardly from the base, or on an arm extending from the top of the leg, so that the operator can actuate the ram from a standing position. The arm also allows for easy carrying and positioning of the machine.

The method for forming the aeration holes in the drywall using the machine begins by removal of any baseboard at the bottom of the wall, and then positioning the base of the machine on the floor against the wall. Then, the pneumatic cylinder can be actuated via the switch on the leg or the handle by the standing operator to force the cutting tip through the drywall and then retracting the tip, thereby leaving a ventilation hole in the drywall adjacent the floor, which can then be hidden when the baseboard is reinstalled.

DETAILED DESCRIPTION OF THE INVENTION

Figure 1:
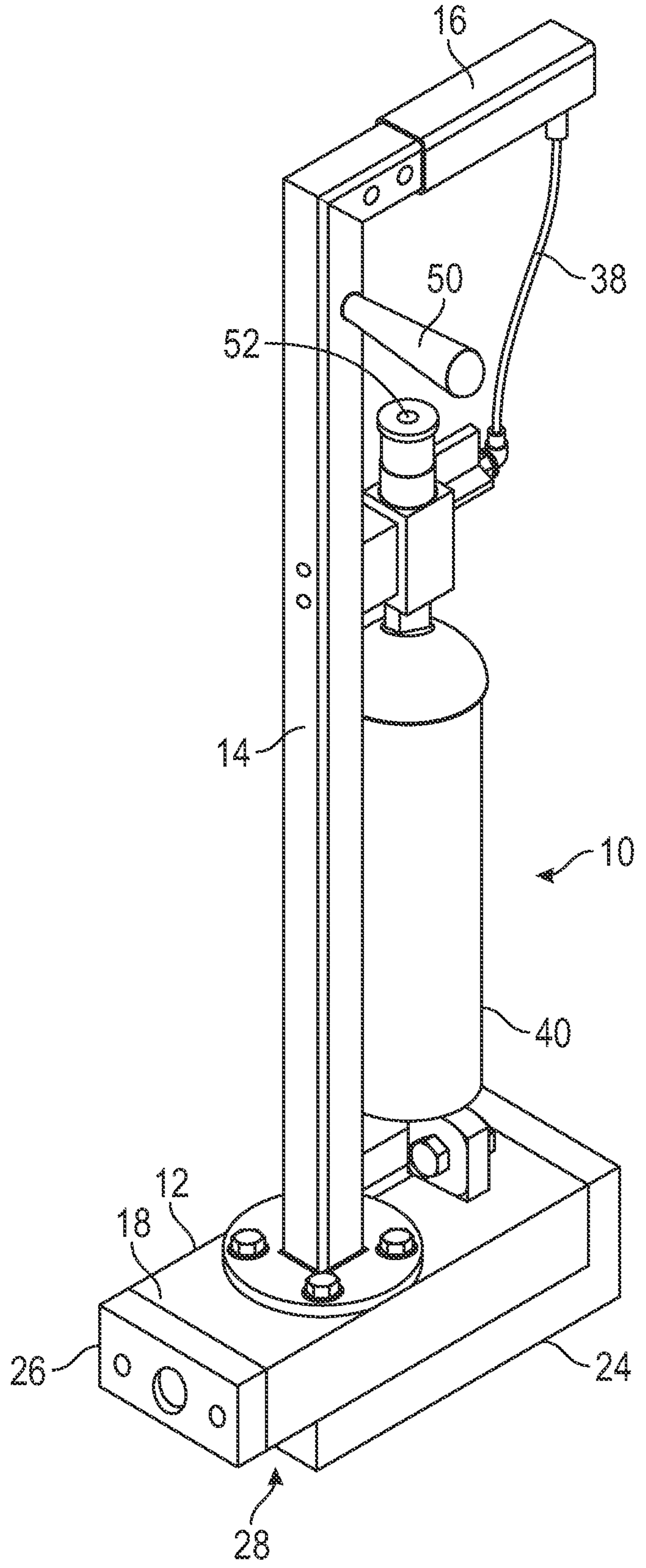
FIG. 1 is a perspective view of the pneumatic drywall hole punch machine according to the present invention.

The pneumatic drywall hole punch machine of the present invention is designated by the reference numeral 10 in the drawings. The machine 10 includes a base 12 with an upstanding leg 14 and a rearwardly extending arm 16.

The base 12 includes a housing 18 in which a pneumatic cylinder 20 and a punch tool 22 are housed. A rubber floor pad 24 is provided on the bottom of the housing 18, and a rubber wall pad 26 is provided on the front of the housing 18. The pads 24, 26 form a notch 28 at the lower front corner of the base 12 to accommodate a carpet tack strip when the machine is positioned on the floor adjacent a wall. Preferably, the notch 28 has a height of approximately 1.25 in. so as to provide clearance above the tack strip for the front end of the housing 18 and the wall pad 26. The pads 24, 26 can be mounted to the housing 18 using recessed screws or bolts, by adhesive, or by other convenient means. The pads 24, 26 are preferably made of a material with sufficient friction to preclude accidental sliding of the machine 10 during use.

The pneumatic cylinder 20 includes an extendable and retractable rod or ram 30, to which the punch tool 22 is mounted. The ram 30 and punch tool 22 move horizontally when actuated. The punch tool 22 preferably is a hollow pipe or tube having a beveled and sharpened front cutting-edge 32. Preferably, the tool has an outside diameter of approximately 1 inch. A hole 34 is formed on the bottom of the punch tool 22 to discharge the punched out drywall material. The housing 18 may also include a lower hole 36 to permit the punched out material to drop therethrough.

Figure 2:
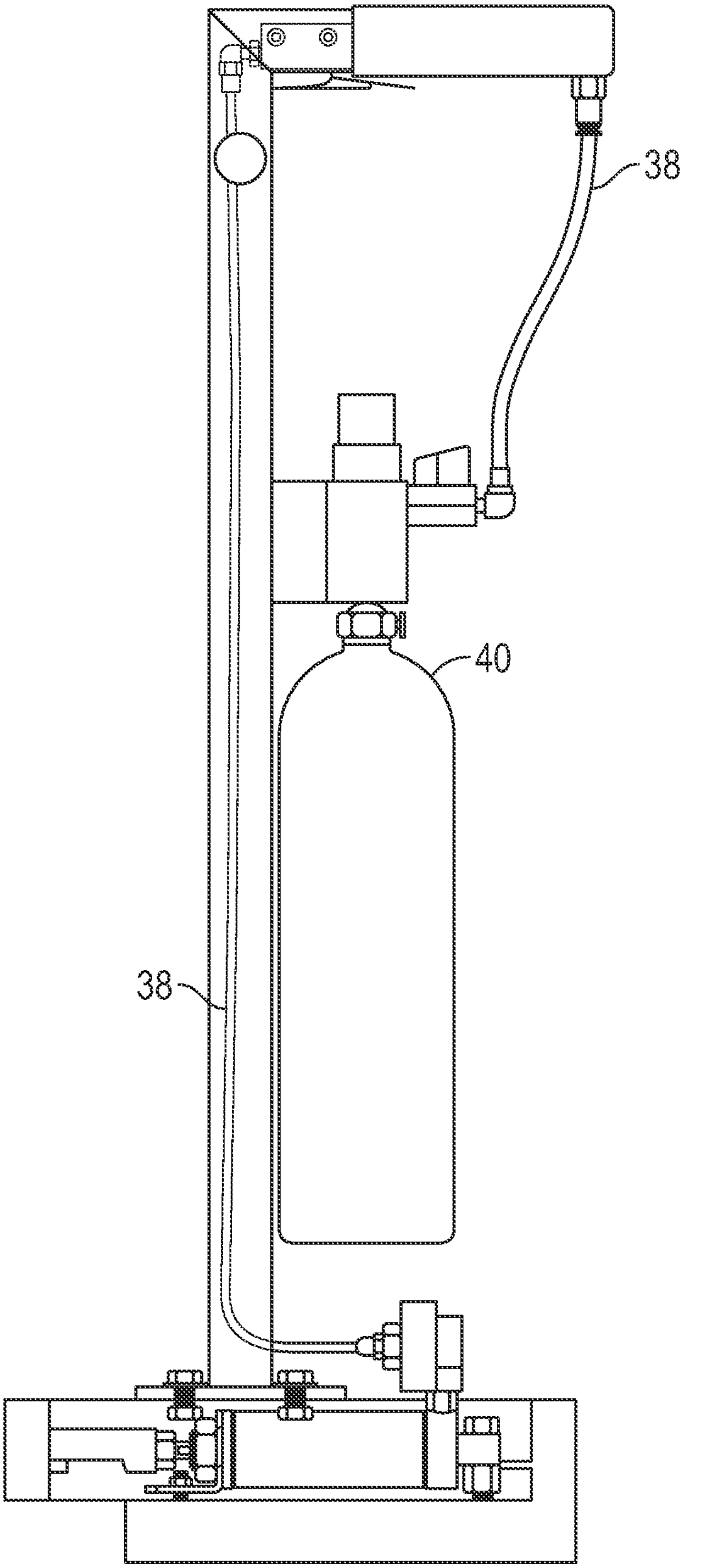
FIG. 2 is a side elevation view of the pneumatic drywall hole punch machine of the present invention.
Figure 6:
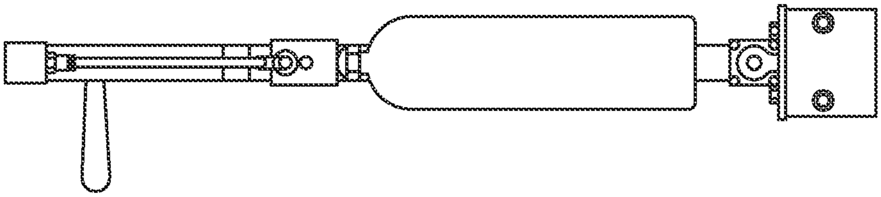
FIG. 6 is a rear view of the machine as shown in FIG. 3.
Figure 5:
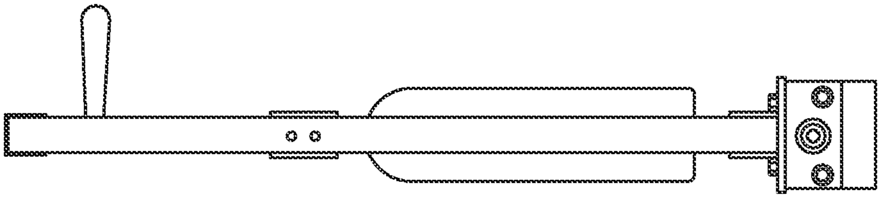
FIG. 5 is a front view of the machine as shown in FIG. 3.
Figure 4:
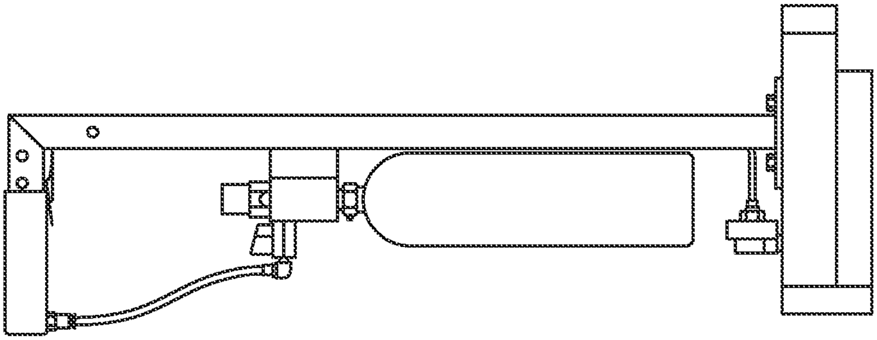
FIG. 4 is another side elevation view of the machine from the left side.
Figure 3:
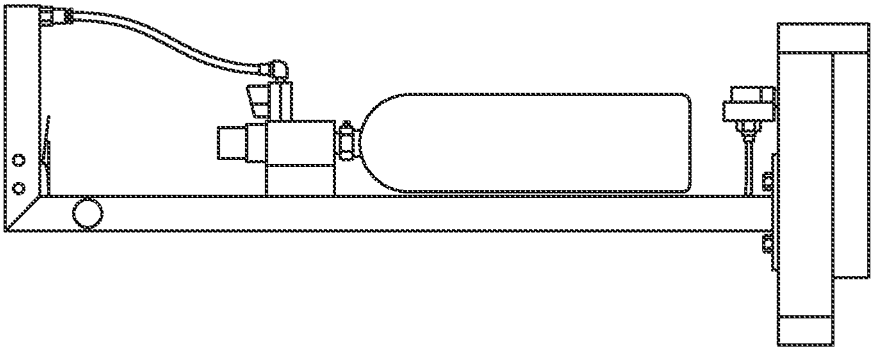
FIG. 3 is another side elevation view of the machine from the right side, including dimensions for a preferred embodiment of the machine.

The pneumatic cylinder 20 is connected by pneumatic hoses 38 to a pressurized gas tank 40. The tank 40 may hold air, carbon dioxide, nitrogen, or other gases or mixtures of gas. The pneumatic circuit between the cylinder 20 and the tank 40 also includes a manual control valve 42 with a trigger or switch 44, a pressure regulator 46, and a quick exhaust valve 48. As seen in FIG. 2, the control valve 42 may be housed within the arm 16 or the leg 14, with the trigger 44 on the outside of the arm or leg, with the hoses 38 extending primarily through the leg 14 and the arm 16.

The gas tank in the preferred embodiment is a 24 oz. size from Interstate Pneumatics, model WRCO2-CL 24-20. The control valve 42 may be model 201-C from Ingersoll-Rand Co. One type of regulator is model TPSP010LP200 from Palmer's Pursuit Shop. An example of the exhaust valve 48 is model SQE200-NO2 from Pneumatic Plus. The pneumatic cylinder 20 may be provided by Parker, model 1.50 PSRBW01.50.

The leg 14 extends upwardly a sufficient height so as to allow an operator to easily grasp the trigger 44 while standing in an upright position. A handle 50 is provided on the leg 14 for gripping by the operator's second hand, so as to stabilize the machine during use and for lifting and moving the machine 10 after each hole is punched.

Figure 9:
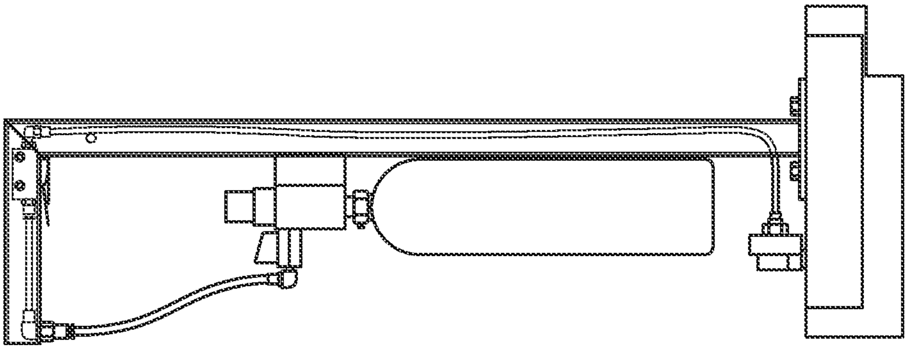
FIG. 9 is a view similar to FIG. 7 with the punch tool retracted.
Figure 8:
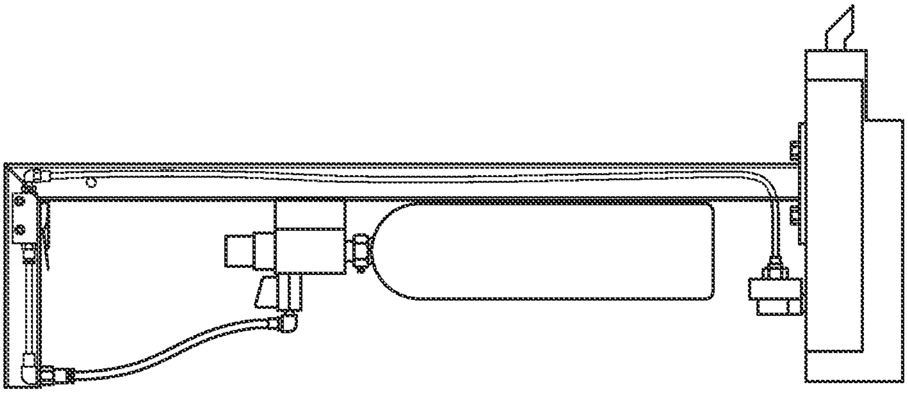
FIG. 8 is a view similar to FIG. 7, with the punch tool extended to form a hole in the drywall.
Figure 7:
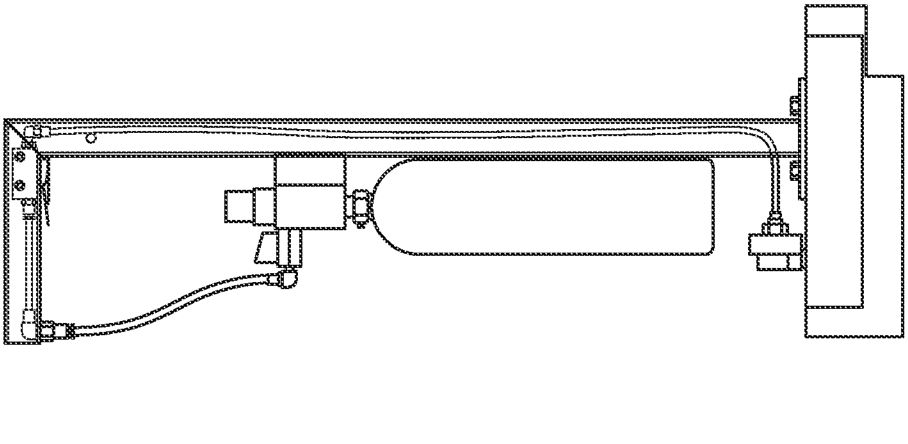
FIG. 7 is side elevation view of the machine in a ready-to-use position as shown in FIG. 1.
Figure 10:
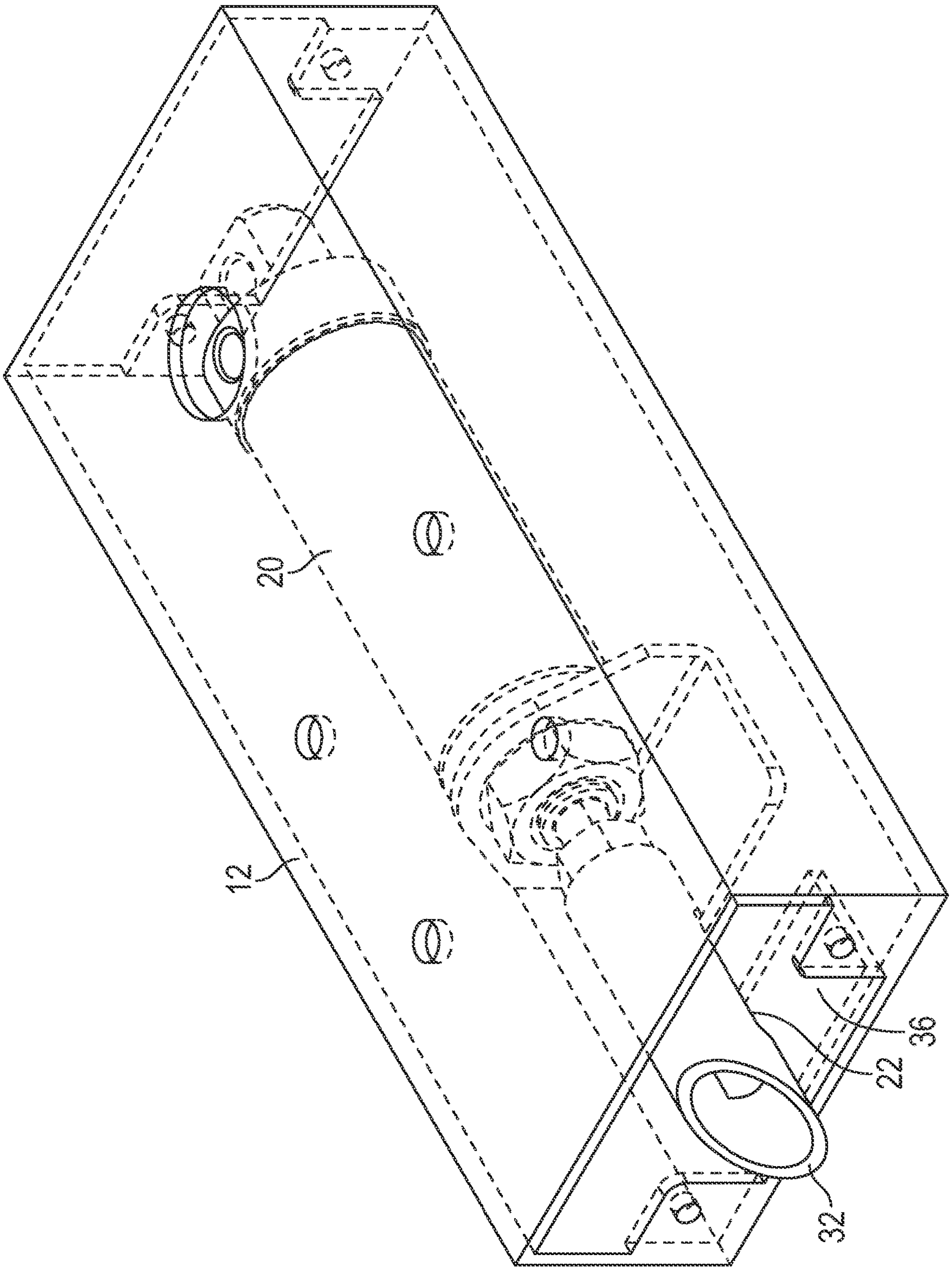
FIG. 10 is a perspective view showing the housing for the pneumatic cylinder and the punch tool in the retracted position.
Figure 11:
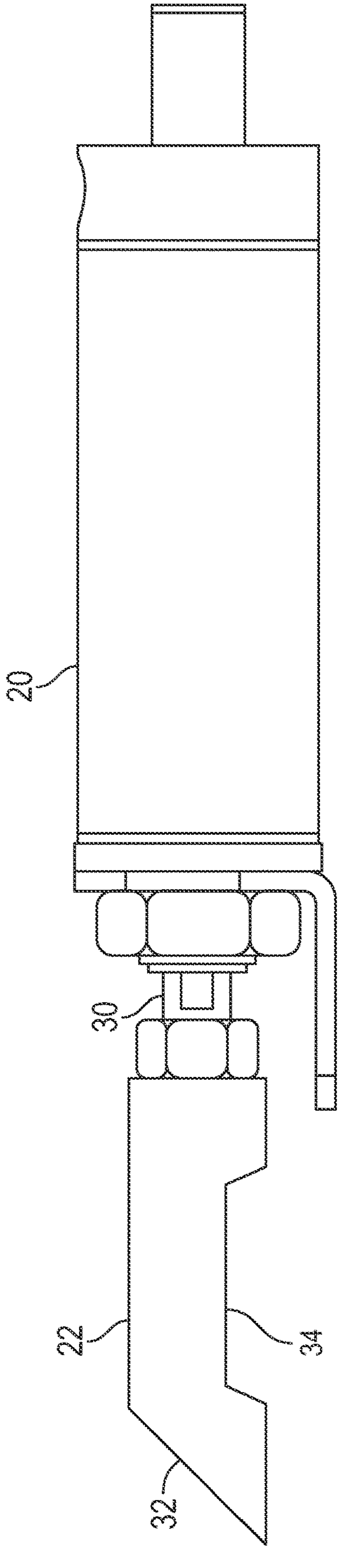
FIG. 11 is a side elevation view of the hydraulic cylinder and punch tool in a retracted position.
Figure 12:
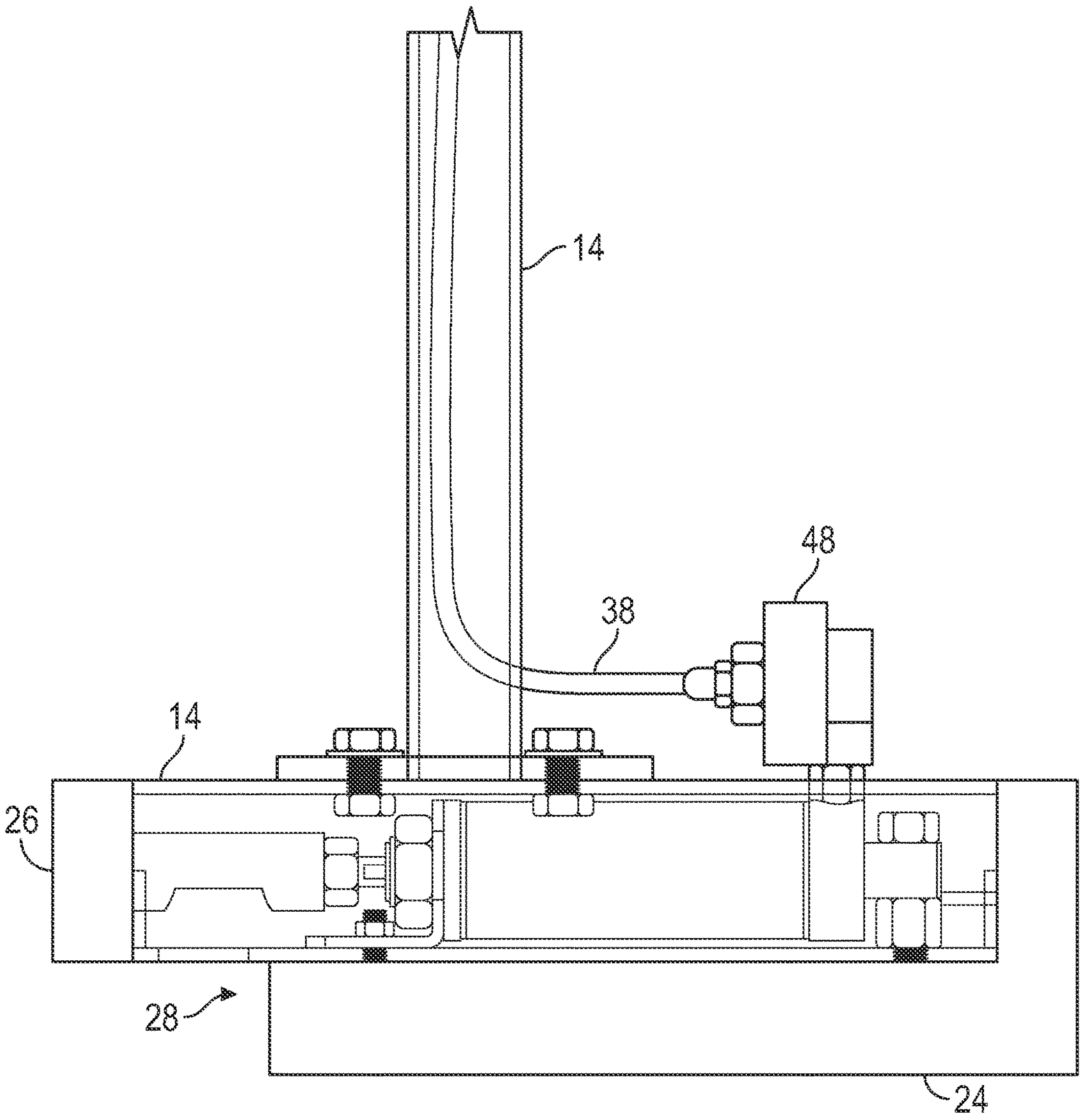
FIG. 12 is an enlarged rear view of the lower end of the machine, with the punch tool retracted.
Figure 13:
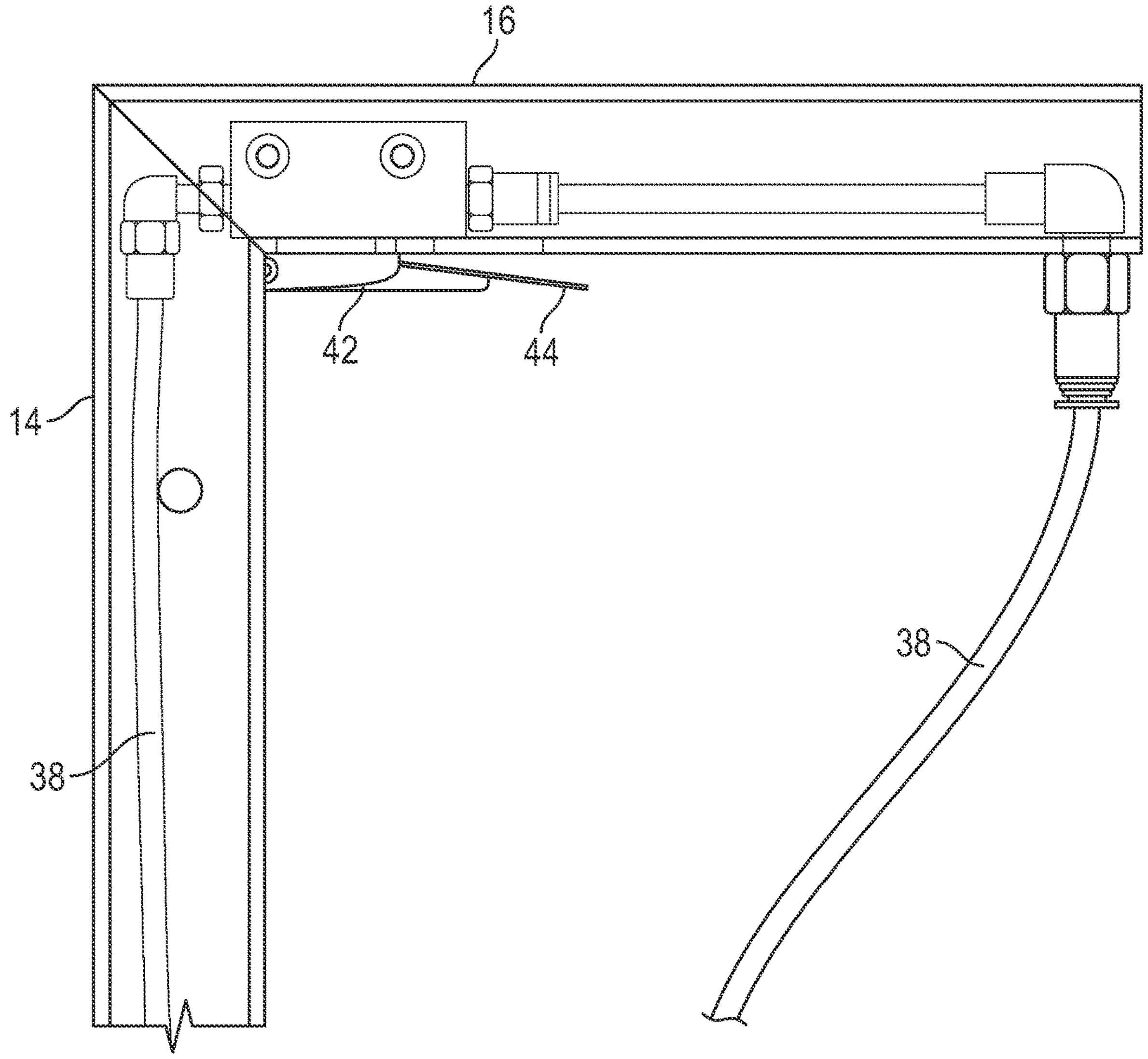
FIG. 13 is an enlarged view of the upper end of the machine, with the trigger valve in an at-rest position.

In use, wet carpeting and the baseboard of the wall are removed. After the operator locates the wall studs, the machine 10 is moved into position on the floor so that the wall pad 26 touches the wall at a location between two wall studs. Then, the operator depresses the trigger 44, which allows pressurized gas from the tank 40 to actuate the cylinder 20 and extend the rod 30 horizontally, such that the cutting-edge 32 of the punch tool 22 is forced through the drywall at a location near the floor that will be hidden by the baseboard after the baseboard is replaced. When the trigger 44 is released, pressure in the cylinder 20 will be vented through the exhaust valve 48, whereby a spring on the cylinder 20 will retract the rod and punch tool 22 into the housing 18, as shown in FIG. 9. Then, the operator can move the machine along the wall to form additional holes in the drywall. Preferably, at least 2 holes are formed in the drywall between each pair of studs. Fans may be utilized to enhance air circulation in the room and through the punched holes in the drywall so as to hasten drying of the sheet rock material. Mold and mildew inhibitors may be sprayed on the back or inside of the drywall via the punched holes.

An optional on/off valve 52 for the regulator 46 may be provided to turn the regulator on and off via the valve 52.

Extra features can also be included on the machine 10, such as a stud finder to locate the wall studs, and/or a digital counter to count the holes punched in the dry wall. In an alternative embodiment, the ram can have two or more spaced apart cutting tips, to punch two or more holes simultaneously with each actuation of the ram. As a further alternative, two or more rams each having one or more cutting tips can be provided in the housing and actuated simultaneously, so that multiple holes can be formed with a single actuation of the switch/trigger.

The light weight, portable machine 10 allows an operator to complete drywall restoration more quickly and accurately, with less errors, less repairs, and less cost. The machine eliminates or minimizes strain on the technician's back and knees, since the holes can be punched in the drywall while standing erect, thus minimizing and reducing work-related injuries and fatigue, while increasing productivity.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A sheet rock hole punch machine for punching a ventilation hole in vertically extending dry wall, comprising:

a base having a horizontal bottom plate, a vertical front plate with a hole, a top plate, a rear plate, and opposite sides forming a housing;

a pneumatic cylinder mounted within the housing and having a horizontally extendable and retractable ram with a cutting tip movable in opposite forward and rearward directions through the hole in the front plate towards and away from the dry wall;

a manually activated switch to actuate the pneumatic cylinder and extend the ram to force the tip horizontally through the dry wall and then retract the ram from the dry wall to form a hole with a horizontal axis in the dry wall;

a leg extending upwardly from the base, and the switch being on an upper end of the leg; and an air tank operatively connected to the pneumatic cylinder;

the ram having an opening for discharging a plug cut by the tip into the housing; and the housing having an opening for discharging the plug.

2. The machine of claim 1 further comprising a pressure relief valve operatively connected to the air tank.

3. The machine of claim 2 further comprising a regulator operatively connected to the air tank, and an on/off switch for the regulator.

4. The machine of claim 1 further comprising a spring on the ram to retract the ram after extension.

5. The machine of claim 1 wherein the base includes a notch at a front lower corner adapted to fit over a carpet tack strip.

6. The machine of claim 1 further comprising an arm extending rearwardly from the leg and a handle extending laterally from the leg.

7. A method of forming a hole in sheet rock panel using a pneumatic punch within a housing having a flat bottom and a flat front face, comprising;

positioning the housing bottom on a floor with the front face against the sheet rock panel;

manually actuating a switch to provide pressurized air to the pneumatic punch so as to extend a cutting tip on the pneumatic punch horizontally through the sheet rock panel to cut a plug from the sheet rock and form a hole therein;

discharging the plug from the ram into the housing; and discharging the plug from the housing.

8. The method of claim 7 wherein the actuation is performed by a standing operator and the switch is hand operated.

9. The method of claim 7 further comprising regulating the pressurized air via a pressure regulator.

10. A sheet rock hole punching tool for punching holes in sheet rock, comprising;

a base formed by a housing having a flat bottom adapted to sit flush on a floor and a flat front face adapted to flushingly engage the sheet rock, and the base having a bottom front notch to accommodate a carpet tack strip;

a horizontally extendable and retractable cutter within the housing;

a pressurized air supply tank operatively fixed to the base to pneumatically extend the cutter horizontally to punch through the sheet rock to cut a plug and thereby form a hole therein;

the cutter having an opening to discharge the plug into the housing; and the housing having an opening to remove the plug.

11. The tool of claim 10 further comprising a manually operated switch to actuate the air supply to extend the cutter.

12. The tool of claim 11 further comprising an upstanding leg connected to the base, and upon which the switch is mounted for control by an operator standing next to the tool.

13. The tool of claim 10 further comprising an air pressure regulator connected to the air source to control the air pressure.

14. The tool of claim 10 further comprising a handle extending laterally from the leg for gripping by an operator during punching of the sheet rock.

* * * * *